April 16, 1963  R. ALSWANG  3,085,799
THEATRICAL PROCEDURE AND STAGE SETTING THEREFOR
Filed March 23, 1960

INVENTOR:
RALPH ALSWANG
BY
Frederick Breitenfeld
ATTORNEY

United States Patent Office 3,085,799
Patented Apr. 16, 1963

3,085,799
THEATRICAL PROCEDURE AND STAGE SETTING THEREFOR
Ralph Alswang, Valley Forge Road, Weston, Conn.
Filed Mar. 23, 1960, Ser. No. 17,143
3 Claims. (Cl. 272—10)

This invention relates generally to theatrical effects, and has particular reference to productions involving both live action and motion picture projection.

A principal object of the invention is to provide an improved apparatus and procedure by means of which transitional effects between screen-projected images and live stage action can be achieved smoothly and efficiently, and without distraction of the audience.

Another object is to establish stage equipment that is adapted to be used, at will, in various ways, to achieve different theatrical results, including the transitional effects referred to.

A still further object is to provide the apparatus and equipment in a form which can be manufactured and installed at reasonable cost, and which is reliable and thoroughly practical in operation.

The invention is predicated upon the conjoint use, in a special relationship, of screens or "drops" having selected specialized properties. In brief, the improved apparatus involves a superposed relatively movable arrangement of a front curtain or screen composed of a loose-woven relatively thin material such as scrim, and a back curtain or layer composed of a heavier material of normally opaque nature such as muslin having a front face of good light-reflecting quality and a rear face having a special coating of translucent scenic character. The equipment includes means for rapidly bringing these layers either into close proximity, one behind the other, or into a separated relationship to define an appreciable space between them. Also forming part of the apparatus are a stage with which the composite screen is in contact, a motion picture projector in front, a back lighting arrangement, and illuminating means operable in the space between the screen layers when they are separated.

In one embodiment of the invention the screen assembly includes also a third opaque curtain or drop movable endwise into and out of a sandwiched position between the front and rear layers.

A preferred way of achieving the foregoing objects, and such other objects as may hereinafter appear or be pointed out, is illustratively exemplified in the accompanying drawings, in which—

Figure 1:
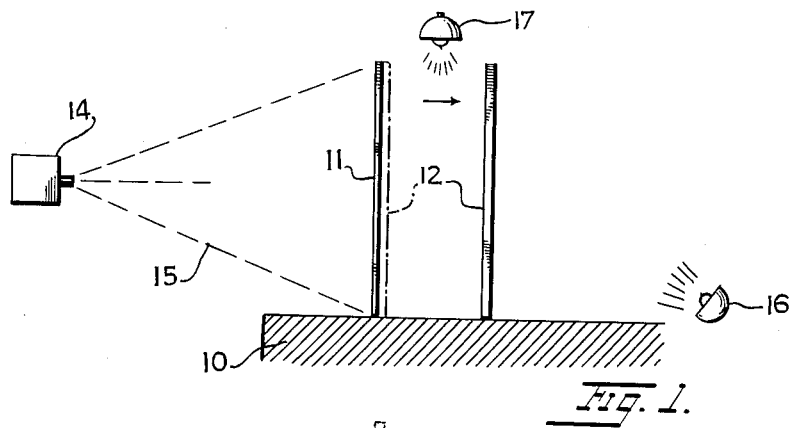
FIGURE 1 is a diagrammatic representation, from the side, of an apparatus embodying the features of the invention.
Figure 2:
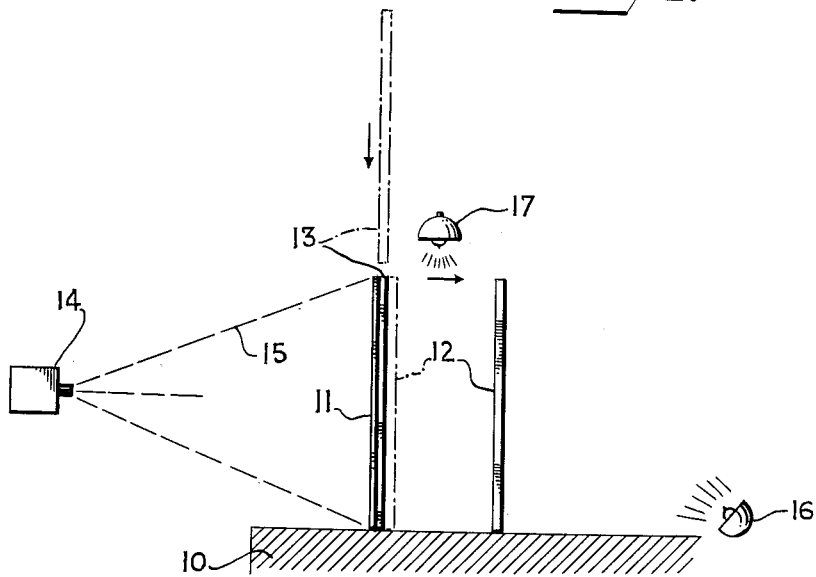
FIGURE 2 is a similar view of the modified three-ply arrangement.

In each of FIGURES 1 and 2, a stage is indicated at 10, the audience being assumed to be situated at the left. Extending upward from the stage, as shown in FIGURE 1, are two screen layers 11 and 12. These may be of any desired dimensions such as those conventionally employed for exhibiting motion pictures and they may be marginally reinforced, and supported, in any suitable way. The layer 11 is at the front end, so far as forward or rearward movements are concerned, it may remain in one position at all times. Obviously, if desired, it may be movable, endwise, to withdraw it from in front of the rear layer 12. The rear layer 12, on the other hand, is supported and mounted in any convenient known manner (by means which are thought to be unnecessary to illustrate) to allow it to be rapidly adjusted between the forward position shown in dotted lines in FIGURE 1 and the rearward position shown in full lines.

In FIGURE 2, the screen assembly includes, as a third optional element, an intermediate drop 13 supported and mounted in known fashion (not shown) to allow it to assume either the lowered position shown in full lines or the elevated or otherwise withdrawn position shown in dotted lines. The drop 13 is so located that when it is in the full-line position it lies directly and closely behind the front layer 11.

In each of FIGURES 1 and 2, a motion picture projector 14 is located in front of the stage, in any usual position, and is adapted to project images upon the screen as indicated diagrammatically at 15. At the rear of the stage, behind the rear screen layer 12, is a back lighting means indicated at 16; and overhead or at the side or sides (or conceivably in the stage floor itself) is an illuminating means 17 adapted to be activated to light the space between the elements 11 and 12 when they are separated.

Figure 3:
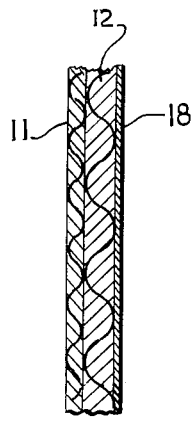
FIGURE 3 is a greatly enlarged fragmentary cross section through the 2-ply screen construction of FIGURE 1, with the layers in close juxtaposition.

The detailed cross-sectional representation of the screen parts 11 and 12, shown in FIGURE 3, indicates the relative thinness and woven character of the front element 11, and the provision on the rear face of the rear element 12 of a coating 18 of translucent substance such as aniline-base paints. This coating is a scenic depiction or set design identical in size and design with a scene of the motion picture to be projected onto the screen by projector 14.

Before describing the various ways in which this apparatus may be employed, it should be noted that the front ply 11 of the screen is composed of scrim because of its translucency and texture; and the rear layer is preferably composed of muslin or its equivalent because such a material is normally opaque, yet sufficiently translucent to allow the scene depicted on its rear face to become visible from the front when it is back lighted.

To indicate the versatility of the apparatus, let it be assumed first that the screen elements 11 and 12 are close together as shown by the dotted line position of element 12 in FIGURE 1. Under these circumstances, the two-ply screen affords an excellent means for receiving and reflecting images projected upon its front face by the projector 14. Scrim provides a good texture for this purpose.

If it is desired to effect a transition from projected image to live action, the projector 14 is so operated, on cue, that there is a rapid fade-out of the motion picture at exactly the time when the scene painted on the back of element 12 is projected. Simultaneously, the screen element 12 is shifted back to the full-line position of FIGURE 1, and the back lighting 16 is made effective. Because of the translucence of the scrim 11, live action can now take place in the space between the screen layers 11 and 12, and if desired the lighting 17 may also be brought into operation. All the steps described are performed simultaneously, as a result of which the transition from motion picture to live action (and vice versa if desired) is produced with unusual effectiveness.

Under certain circumstances it may be necessary or desirable to block from view the space behind the image-receiving scrim 11. For example, if the drop 12 is to be replaced by another, bearing a different set design on its rear face, such a view-blocking condition is desirable. This may be accomplished by interposing the opaque preferably dark-hued drop 13, as shown in full lines in FIGURE 2. Then at an inconspicuous appropriate time, depending upon the nature of the projected images, the curtain 13 is withdrawn and the section 12 brought into position directly behind the scrim 11. The type of transition previously described then becomes possible again, at the time the motion picture reaches the scene which is identical with that painted on the rear face of element 12.

The structural and procedural features described may obviously be modified in various respects. For example, by employing the intermediate drop 13 and leaving it in position until the moment of transition, live actors or additional scenic equipment may be in position in front of the rear screen 12 at the time of transition. Or, if the intermediate drop 13 is not used, or has been previously withdrawn, live action may enter the space in front of the rear screen 12 at the time of or after the moment of transition, possibly through a door or other access opening in the screen 12 itself.

The mechanism by means of which the screen layer 12 is moved forwardly and rearwardly may be of any suitable rapidly operable kind. The magnitude of movement need not be more than a foot or so, and a shifting movement of almost instantaneous character is therefore mechanically feasible. Under some circumstances the rear screen 12 may be left in its original position close behind the scrim 11 at the time of transition, but of course live action would then necessarily occur in front of the scrim layer 11 rather than behind it. The layer 11 may be left in place under these circumstances since its translucency would not materially affect the visibility of the back lighted scenic design 18.

In general, it will be understood that changes in the details described may be made in various ways, by those skilled in the art, without necessarily departing from the spirit and scope of the invention as expressed in the appended claims.

What is claimed is:

1. In a theatrical stage setting, a motion picture screen comprising front and rear layers, the front layer being composed of scrim and the rear layer being composed of heavier but translucent material, said rear layer having a highly light-reflective front face and bearing on its rear face a set design composed of translucent coating material, said design being invisible from the front except when the rear layer is back lighted, whereby rapid fading of a motion picture projected onto said screen from the front, coupled on cue with a rapid accretion of back lighting onto said set design, and vice versa, can create a dissolve between motion picture and live stage; and means for rapidly moving said rear layer between a front position closely behind the scrim and a retracted position adequately rearward to allow live action to take place between said layers.

2. The theatrical stage setting defined in claim 1, wherein said screen layers include an intermediate layer of dark-hued opaque material, and means for rapidly interposing and withdrawing said intermediate layer edgewise between the screen layers.

3. A theatrical procedure allowing creation of a dissolve between motion picture and live stage, which consists in projecting a motion picture onto the front face of a screen of translucent material, providing on the rear face of said screen a set design composed of translucent coating material and identical in size and design with a scene of said motion picture, and coordinating the projection of said scene with simultaneous rapid fade-out of the motion picture and back lighting of said screen, and vice versa.

References Cited in the file of this patent
UNITED STATES PATENTS

| | | |
|---|---|---|
| 45,449 | Callcott | Dec. 13, 1864 |
| 570,255 | Kerner | Oct. 27, 1896 |
| 1,031,879 | Smith et al. | July 9, 1912 |
| 1,304,649 | Bell-Ranske | May 27, 1919 |
| 1,372,969 | McCormick | Mar. 29, 1921 |